W. H. LUQUIRE.
LOCK NUT FOR VEHICLE SPINDLES.
APPLICATION FILED AUG. 4, 1911.
1,031,353.
Patented July 2, 1912.
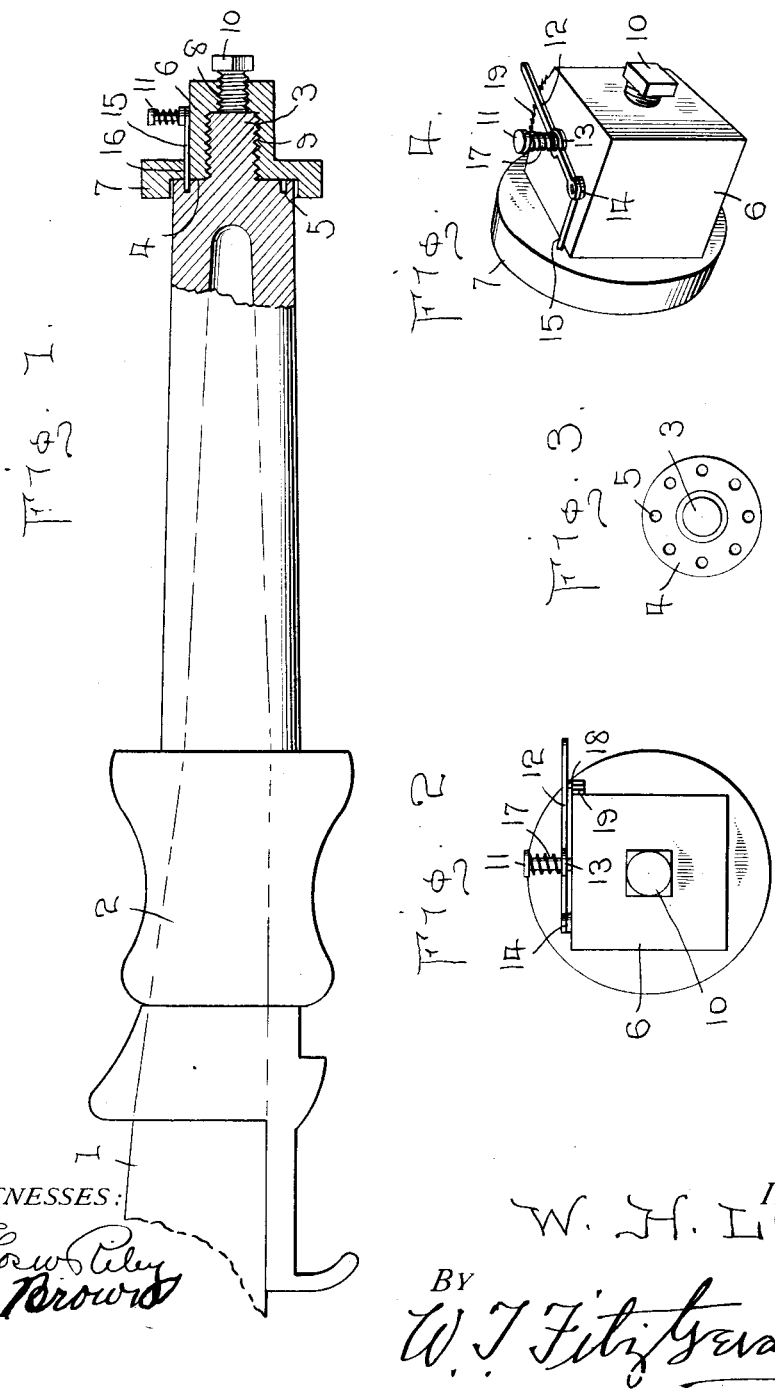

UNITED STATES PATENT OFFICE.

WILEY H. LUQUIRE, OF BIRMINGHAM, ALABAMA.

LOCK-NUT FOR VEHICLE-SPINDLES.

1,031,353.  Specification of Letters Patent. Patented July 2, 1912.

Application filed August 4, 1911. Serial No. 642,280.

*To all whom it may concern:*

Be it known that I, WILEY H. LUQUIRE, a citizen of the United States, residing at Birmingham, in the county of Jefferson and State of Alabama, have invented certain new and useful Improvements in Lock-Nuts for Vehicle-Spindles; and I do hereby declare the following to be a full, clear, and exact description of the invention, such as will enable others skilled in the art to which it appertains to make and use the same.

This invention relates to lock nuts for vehicle spindles and more especially to attachments to the ordinary nuts on vehicle spindles to lock them upon the spindles and prevent them from coming off while the vehicle is in motion and also take up lost motion in the bearings.

An object of the invention is to provide a device of this character which will securely lock the nut in position, the principal part of which will be positioned on the outside of the nut, making it impossible for the locking mechanism to be worn by friction, and, Another object is to devise a locking mechanism which may be employed in connection with the ordinary nut upon the usual form of spindle now in use to positively lock the nut upon the spindle.

Other objects and advantages will be hereinafter set forth and pointed out in the specification and claims.

In the accompanying drawings which are made a part of this application, Figure 1 is a longitudinal view of one end of a spindle upon an axle and the nut locked upon the end of the spindle by my improved locking mechanism, parts being shown in section. Fig. 2 is an enlarged end view. Fig. 3 is a detail view looking at the end of the spindle, the nut being removed therefrom, and, Fig. 4 is an enlarged perspective view of the nut carrying the locking means.

Referring to the drawings in which similar reference numerals designate corresponding parts throughout the several views, 1 indicates the axle, which may be of wood, steel or any other material, and 2 is the spindle secured upon the end of the axle.
The spindle is reduced and threaded at its outer end, as shown at 3, forming the circular shoulder 4, which is provided with a plurality of circularly arranged horizontally extending openings 5, the purpose of which will later be fully stated.

The nut 6 is adapted for threaded engagement over the reduced threaded end 3 of the spindle 2 and has the surface resting against the shoulder 4 of the spindle 2, which is hollowed out a suitable distance to form the circular flange 7, which extends beyond the shoulder 4, when the nut is screwed home. It will be evident that the flange 7, fitting snugly against the spindle 2 adjacent the shoulder 4, will protect the openings 5 and prevent dirt, grease, etc., from entering these openings and clogging the same. The internally threaded portion of the nut, working upon the reduced threaded end 3 of the spindle, terminates a short distance inwardly of the outer end of the nut, which outer end is provided with an internally threaded bore 8 communicating with the larger internally threaded bore 9 working upon the reduced end 3 of the spindle. Through the small internally threaded bore 8 is engaged the set screw or bolt 10, the flat end of which engages against the extremity of the spindle to tighten and lock the nut upon the spindle and hold the same against rotation.

From the circular flange 7 to the outer end of the nut, the same is preferably square for engagement by a wrench to rotate the nut. Projecting from one of the sides of the square portion of the nut 6, is the pin 11, over which is engaged the lever arm 12, said arm 12 having an enlarged portion 13 with a circular opening to receive the pin
11. One end of the lever arm 12 is pivoted, as shown at 14, to one end of the locking rod 15 which works through an opening 16 in the circular portion of the nut for engagement in the horizontally extending openings 5 in the circular shoulder 4 of the spindle 2. The lever arm 12 is resiliently pressed against the side of the nut from which the pin 15 projects by means of a coil spring 17 around the pin 11. The lever arm 12 is held in any desired position by means of a lug or projection 18 near its free end, which is held in engagement with ratchet teeth 19 upon the adjacent edge of the nut under the tension of the spring 17. It will be understood that the ratchet teeth 19 may be integral with the nut or secured thereto in any suitable manner, as by welding.

It will be evident that by lifting the free end of the lever 12 to disengage the lug 18 from the ratchet teeth 19 and swinging the same upon the pin 11 to force the free end of the lever toward the opposite end of the axle, the free end of the locking pin 15 will be drawn out of the opening 5 within which it has been resting and after the loosening of the set screw or bolt 10, the nut may be rotated in either direction. When the nut is in the proper position the lever 12 is raised and moved in the opposite direction to force the free end of the locking rod 15 into the proper opening 5 and the screw or bolt 10 is tightened, thus preventing all possibility of the loosening of the nut and working off of the same from the spindle end 3.

It will be evident that this locking mechanism may be employed with the usual form of spindle and may be readily applied to the nuts now in use at an extremely small cost.

It will also be evident that the nut will be positively locked upon the end of the spindle and will be prevented from working off of the spindle or becoming loose and causing annoyance and probably serious damage.

What I claim is:

The combination with a spindle having a reduced threaded end forming a circular shoulder around said threaded end at the connection thereof with the remainder of the spindle, said circular shoulder having openings therein, of a nut upon the threaded end of the spindle, said nut having a square portion and a round portion, locking means carried upon the square portion and working through the round portion for engagement in the openings of the circular shoulder of the spindle, a lever centrally pivoted to the nut and having one end pivoted to the locking means, means on the nut for engagement with the free end of the lever to lock the latter and means for resiliently pressing the lever against the square portion of the nut to hold the lever in engagement with its locking means.

In testimony whereof I have signed my name to this specification in the presence of two subscribing witnesses.

WILEY X H. LUQUIRE.
his mark

Witnesses:
A. C. EDWARDS,
LILLIAN MADDOX.

Copies of this patent may be obtained for five cents each, by addressing the "Commissioner of Patents, Washington, D. C."